(12) United States Patent
Balakrishnan et al.

(10) Patent No.: US 12,039,544 B2
(45) Date of Patent: Jul. 16, 2024

(54) ADAPTIVE M2M BILLING

(71) Applicant: Aeris Communication, Inc., San Jose, CA (US)

(72) Inventors: Subramanian Balakrishnan, Cupertino, CA (US); Jins George, Fremont, CA (US)

(73) Assignee: Aeris Communications, Inc., San Jose, CA (US)

( * ) Notice: Subject to any disclaimer, the term of this patent is extended or adjusted under 35 U.S.C. 154(b) by 620 days.

(21) Appl. No.: 17/345,494

(22) Filed: Jun. 11, 2021

(65) Prior Publication Data

US 2021/0304215 A1  Sep. 30, 2021

Related U.S. Application Data

(63) Continuation-in-part of application No. 13/945,689, filed on Jul. 18, 2013, now Pat. No. 11,039,017.

(Continued)

(51) Int. Cl.
*G06Q 30/04* (2012.01)
*G06N 20/00* (2019.01)
(Continued)

(52) U.S. Cl.
CPC .......... *G06Q 30/016* (2013.01); *G06N 20/00* (2019.01); *G06Q 20/127* (2013.01);
(Continued)

(58) Field of Classification Search
CPC .... G06Q 30/016; G06Q 40/12; G06Q 20/308; G06Q 20/127; G06Q 20/145;
(Continued)

(56) References Cited

U.S. PATENT DOCUMENTS 5,684,861 A   11/1997  Lewis
6,266,401 B1   7/2001  Marchbanks
(Continued)

FOREIGN PATENT DOCUMENTS

WO   WO 2001037528   5/2001

OTHER PUBLICATIONS

S. Ali, R. Ahmad and D. Kim, "A Study of Pricing Policy for Demand Response of Home Appliances in Smart Grid Based on M2M," 2012 10th International Conference on Frontiers of Information Technology, Islamabad, Pakistan, 2012, pp. 231-236, doi: 10.1109/FIT.2012.48. (Year: 2012).*

(Continued)

*Primary Examiner* — Michelle T Kringen
(74) *Attorney, Agent, or Firm* — Shih IP Law Group, PLLC

(57) ABSTRACT

A computer implemented method, system and computer readable medium for use in machine to machine (M2M) or internet of Things (IoT) network including network devices are disclosed. The computer implemented method comprises providing a guaranteed price plan to a customer for a predetermined time period and learning about network device usage over the predetermined time period to provide a learned price plan. The computer implemented method also comprises determining a new price plan based on the learned price plan. Finally, the computer implemented method comprises utilizing the new price plan with customer's network devices.

24 Claims, 7 Drawing Sheets

Related U.S. Application Data

(60) Provisional application No. 61/784,750, filed on Mar. 14, 2013.

(51) Int. Cl.

| | | |
|---|---|---|
| *G06Q 20/12* | (2012.01) | |
| *G06Q 20/14* | (2012.01) | |
| *G06Q 20/30* | (2012.01) | |
| *G06Q 30/016* | (2023.01) | |
| *G06Q 30/0283* | (2023.01) | |
| *G06Q 40/12* | (2023.01) | |
| *G16Y 10/45* | (2020.01) | |
| *G16Y 10/75* | (2020.01) | |
| *G16Y 40/20* | (2020.01) | |
| *H04W 4/24* | (2018.01) | |
| *H04W 4/70* | (2018.01) | |

(52) U.S. Cl.
CPC ........ *G06Q 20/145* (2013.01); *G06Q 20/308* (2020.05); *G06Q 30/0284* (2013.01); *G06Q 30/04* (2013.01); *G06Q 40/12* (2013.12); *G16Y 10/45* (2020.01); *G16Y 10/75* (2020.01); *G16Y 40/20* (2020.01); *H04W 4/24* (2013.01); *H04W 4/70* (2018.02)

(58) Field of Classification Search
CPC ..... G06Q 30/0284; G06Q 30/04; H04W 4/70; H04W 4/24; G06N 20/00; G16Y 40/20; G16Y 10/75; G16Y 10/45
See application file for complete search history.

(56) References Cited

U.S. PATENT DOCUMENTS

| | | | |
|---|---|---|---|
| 6,606,377 | B2 | 8/2003 | Ruckart |
| 7,420,920 | B2 | 9/2008 | True |
| 7,945,240 | B1 | 5/2011 | Klock et al. |
| 8,195,783 | B2 | 6/2012 | Crimi |
| 8,315,594 | B1 | 11/2012 | Mauser |
| 8,374,579 | B2 | 2/2013 | Marsh |
| 8,380,579 | B2 | 2/2013 | Flinn |
| 8,566,527 | B2 | 10/2013 | Reidel |
| 8,577,329 | B2 | 11/2013 | Momtahan |
| 8,582,457 | B2 | 11/2013 | Leemet |
| 2002/0156749 | A1 | 10/2002 | Sardy |
| 2002/0160748 | A1 | 10/2002 | Rahman |
| 2005/0053211 | A1 | 3/2005 | Bevente et al. |
| 2006/0085301 | A1 | 4/2006 | Leahy |
| 2006/0265302 | A1 | 11/2006 | Schmalenberger et al. |
| 2008/0059346 | A1 | 3/2008 | Schweitzer et al. |
| 2008/0204792 | A1 | 8/2008 | Frost |
| 2009/0098854 | A1 | 4/2009 | Park et al. |
| 2010/0274588 | A1 | 10/2010 | Choubey |
| 2011/0016321 | A1 | 1/2011 | Sundaram et al. |
| 2011/0087550 | A1 | 4/2011 | Fordyce, III et al. |
| 2011/0268047 | A1 | 11/2011 | Nath et al. |
| 2012/0046991 | A1 | 2/2012 | Bai et al. |
| 2012/0059748 | A1 | 3/2012 | Matsuo |
| 2012/0143733 | A1 | 6/2012 | Kappauf |
| 2012/0231828 | A1 | 9/2012 | Wang |
| 2012/0239739 | A1 | 9/2012 | Manglik |
| 2012/0306613 | A1* | 12/2012 | De La Rue ............ H04W 4/70 340/5.2 |
| 2012/0329424 | A1 | 12/2012 | Gudlavenkatasiva et al. |
| 2013/0003609 | A1 | 1/2013 | Ballot et al. |
| 2013/0132854 | A1 | 5/2013 | Raleigh et al. |
| 2013/0196626 | A1* | 8/2013 | Zalmanovitch ....... H04M 15/86 455/407 |
| 2014/0006237 | A1* | 1/2014 | Chiang .................. G06Q 30/04 705/34 |
| 2015/0280765 | A1 | 10/2015 | Lowery |
| 2015/0326736 | A1 | 11/2015 | Lehane |

OTHER PUBLICATIONS

The International Search Report and the Written Opinion of the International Searching Authority for International Application No. PCT/US2014/029528, mailed Nov. 21, 2014.

"AdaptivePricing and Usage-Based Billing", SAP AG or an SAP affiliate company, 2013, Retrieved on Feb. 24, 2014 from:https://www.google.com/url?sa=t&rct=j&q=&esrc=s&source=web&cd=1&cad=rja&ved=0CCYQFjAA&url=http%3A%2F%2Fwww.sap.com%2Fbin%2Fsapcom%2Fdownloadasset.solution-in-detailindustrial-machinery-and-components-adaptive-pricing-and-usage-based-billingpdf.

"Understanding Your Budget-billing Plan", Citizens Utility Board, 2014, Retrieved on Feb. 24, 2014 from: http://www.citizensutilityboard.org/ciNaturalGas_UnderstandingYourBudgetBillingPlan.html#.

* cited by examiner

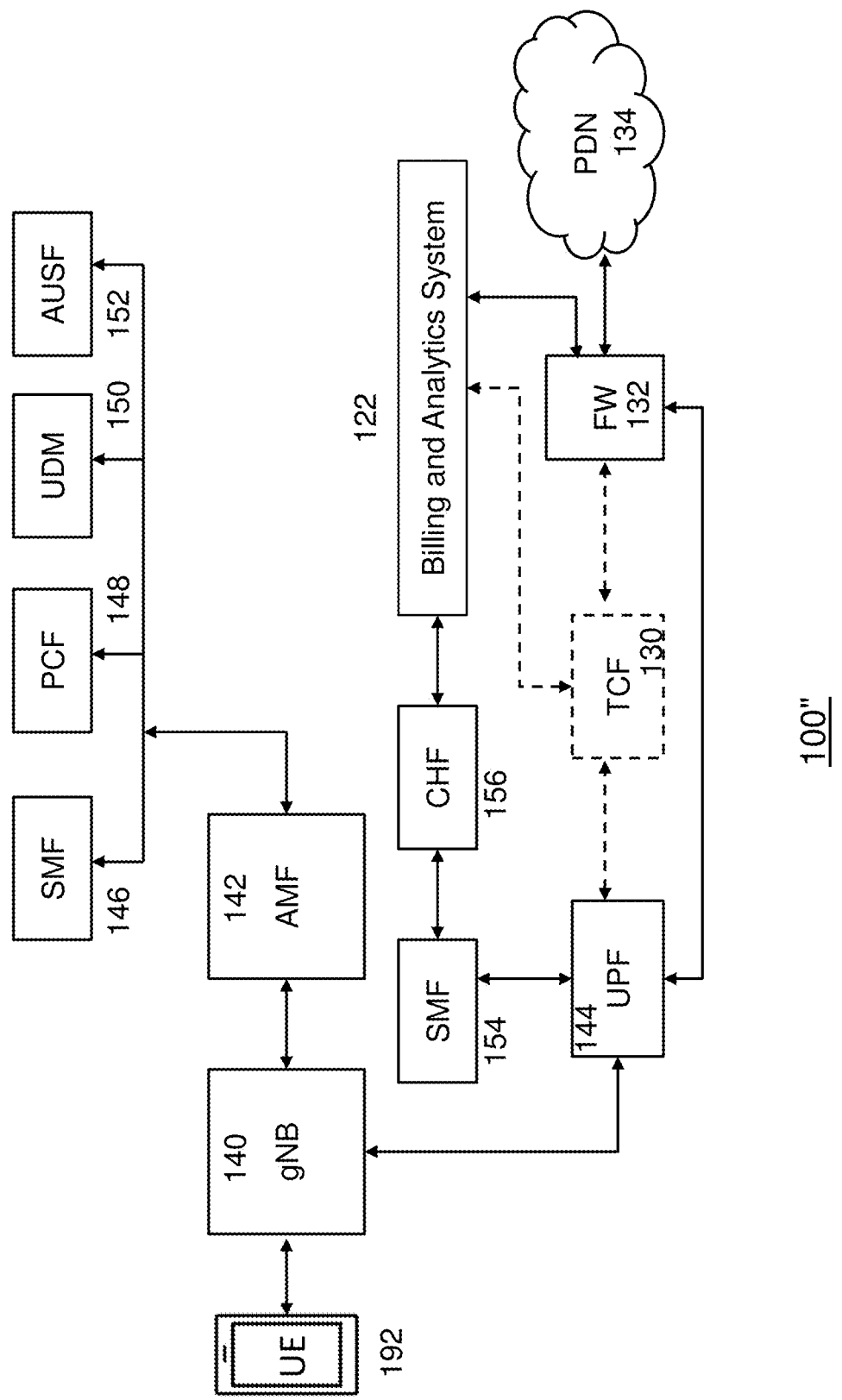

ADAPTIVE M2M BILLING

CROSS-REFERENCE TO RELATED APPLICATIONS

Under 35 USC 119(e), this application is a Continuation-In-Part of U.S. application Ser. No. 13/945,689, filed Jul. 18, 2013, entitled "ADAPTIVE M2M BILLING", which claims priority to U.S. provisional application Ser. No. 61/784,750, filed on Mar. 14, 2013, and is related to U.S. application Ser. No. 13/945,571, filed Jul. 18, 2013, entitled "CONTEXT ORIENTED BILLING", and U.S. application Ser. No. 13/945,645, filed Jul. 18, 2013, entitled "M2M BILLING RECONCILIATION," both assigned to the assignee of the present invention, all of which are incorporated herein by reference in their entireties.

FIELD OF THE INVENTION

The present invention is directed toward machine to machine (M2M)/Internet of Things (IoT) networks and more particularly to a method and system for providing information related to billing in such networks.

BACKGROUND

Machine to Machine (M2M)/IoT systems networks are utilized to provide communications between machines. What is meant by M2M/IoT is one or more machines/devices using network resources to communicate with a remote application infrastructure for the purposes of monitoring and control, either of the "machine" itself, or of the surrounding environment. There is a desire to accurately monitor the billing information associated with this type of networks. The present invention is directed to a need.

SUMMARY

A computer implemented method is disclosed. The computer implemented method comprises providing a guaranteed price plan to a customer for a predetermined time period and learning about network device usage over the predetermined time period to provide a learned price plan. The computer implemented method also comprises determining a new price plan based on the learned price plan. Finally, the computer implemented method comprises utilizing the new price plan with customer's network devices.

BRIEF DESCRIPTION OF THE DRAWINGS

FIGS. 1B and 1C illustrate billing system architecture for 4G LTE and 5G networks respectively according to one or more embodiments of the present invention. It includes network elements and/or user equipment (M2M machines and/or IoT devices) that provide billing data to a billing and analytics system according to one or more embodiments of the present invention.

DETAILED DESCRIPTION

The present invention is directed toward networks and more particularly to a method and system for providing information related to billing in such networks.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
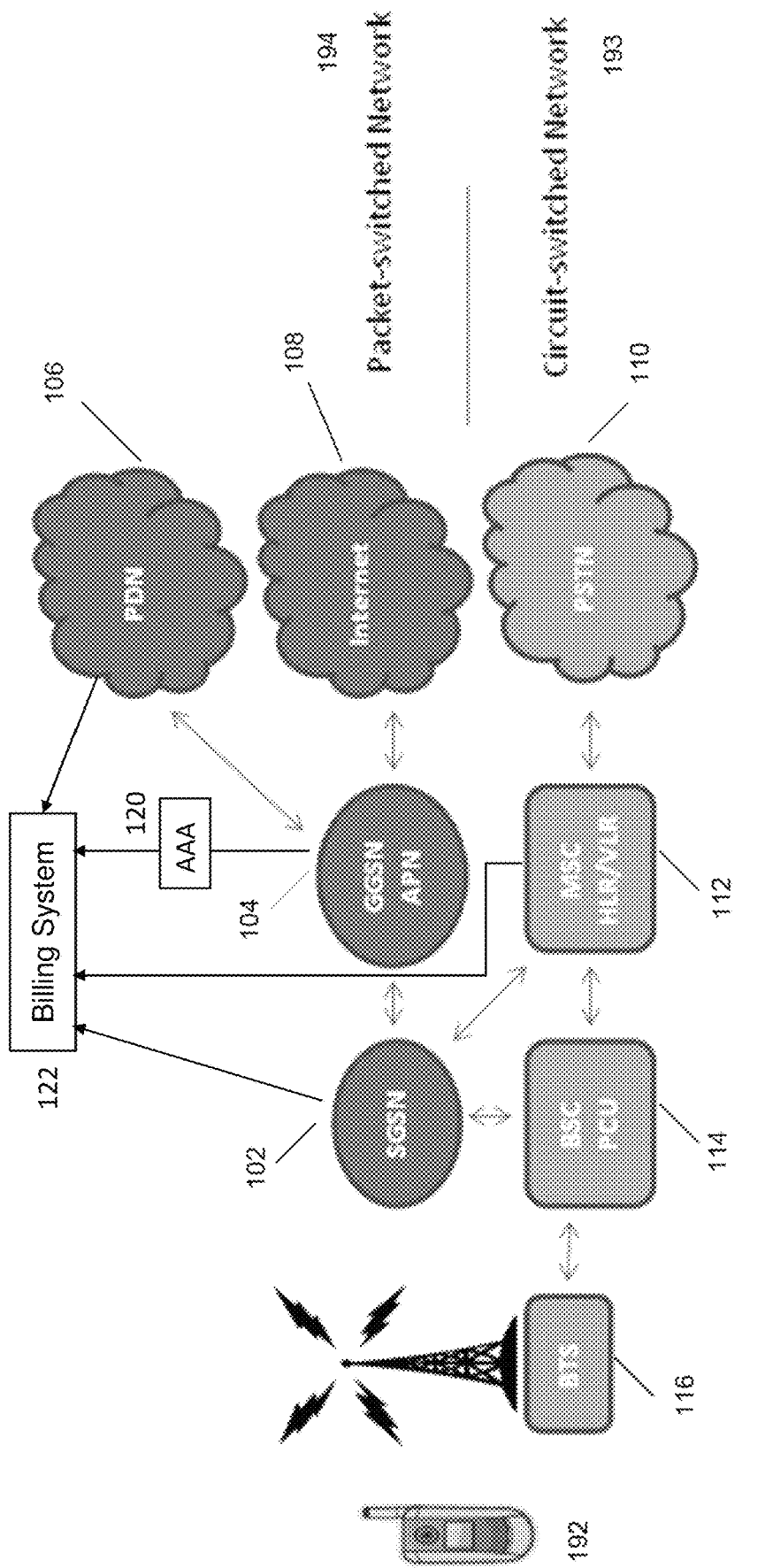
FIG. 1A illustrates a conventional billing system architecture. It includes network elements and/or user equipment (machines) that provide billing data to a billing system.

FIG. 1A illustrates a block diagram of a basic M2M network 100. The M2M network 100 comprises a circuit-switched voice network 193 that connects mobile handsets 192 with the public switched telephone network (PSTN) 110. Overlaid on top of the network is a packet-switched data network 194. Although circuit-switched SMS messages are used in M2M applications, increasingly M2M data is sent in packet format.

Base station controllers (BSCs) 114 control a number of base transceiver stations (BTSs) 116 that control the actual radio towers and interact with the handsets 192. Packet control units (PCUs) 114 transfer packets bound for the General Packet Radio Service (GPRS) network to a local service GPRS support node (SGSN) 102. Home location registers (HLRs) are a function on both the GSM and GPRS network, and essentially serves to identify mobile stations/end-points with specific account information. The SGSN establishes the packet data protocol (PDP) context with the Gateway GPRS support node (GGSN) 104. Upon activation packets bound for external networks (e.g., the Internet 108 or corporate private data networks (PDNs) 106) pass through the mobile packet gateway. Each mobile network gateway contains a number of virtual and physical access point nodes (APNs) 104 that define the specific external network, whether public or private, to which the packet is destined. GGSN 104 communicates with Authentication, Authorization and Accounting server (AAA) 120 to capture the accounting records for billing which are received by the billing system 122, for example, CDMA, 3GPP, 4G LTE and 5G.

Mobile packet gateways like GGSNs along with HLRs are two of the most critical network elements relative to M2M/IoT service deliver in the mobile network. Mobile packet gateways provide security, Quality of Service (QoS) enforcement, and interaction with charging and billing systems for mobile data service. Mobile packet gateways are also central to interconnecting the mobile infrastructure with 3rd-party networks, most importantly ASPs in the case of the M2M/IoT market. HLRs are critical to service creation and management of remote devices in the field.

Figure 1B:
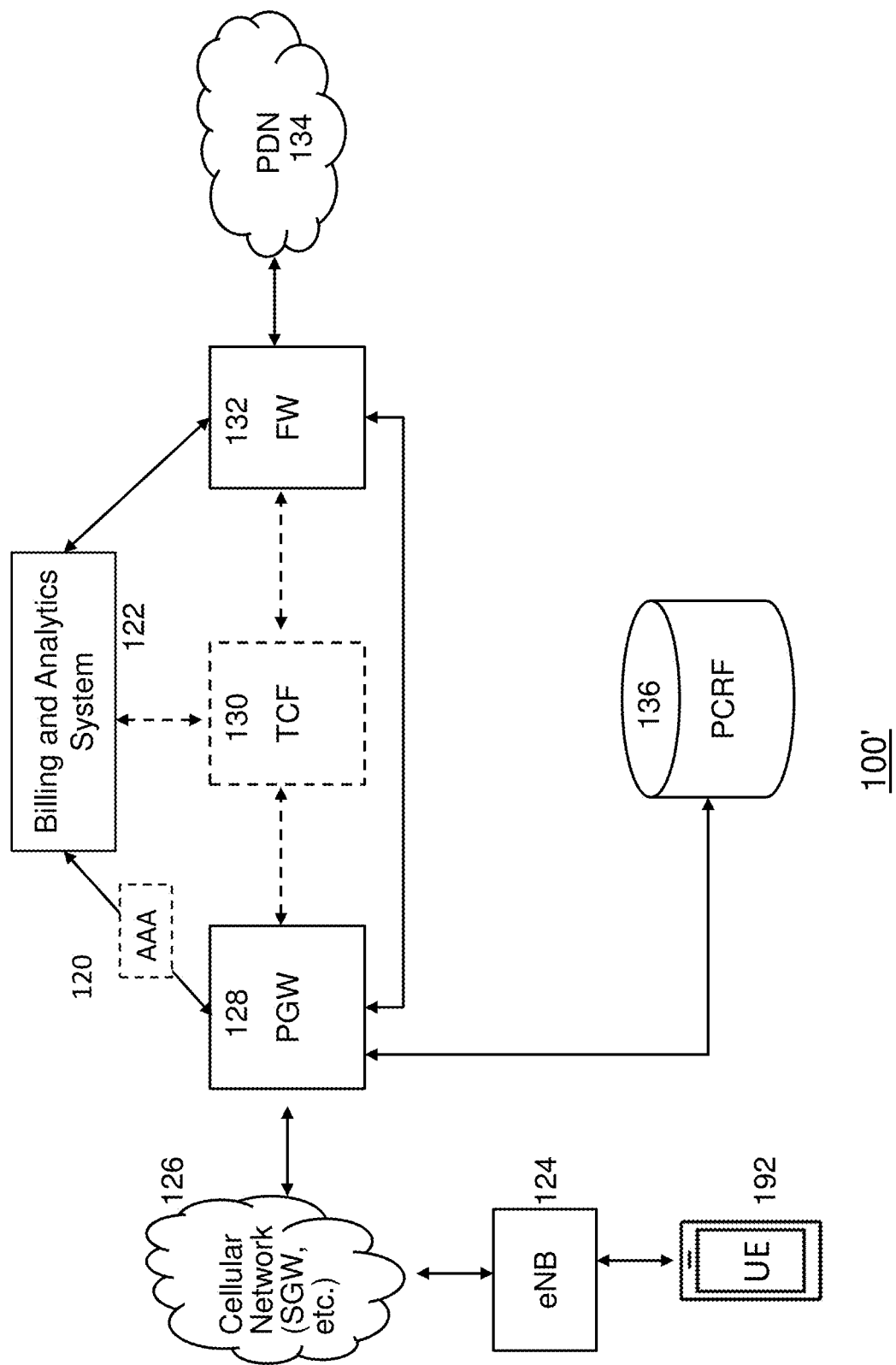

FIGS. 1B and 1C illustrate billing system architectures 100' and 100" for 4G LTE and 5G networks respectively according to one or more embodiments of the present invention. It includes network elements and/or user equipment 192 (M2M machines and/or IoT devices) that provide billing data to a billing and analytics system 122 according to one or more embodiments of the present invention.

In case of 4G/LTE networks, as illustrated in FIG. 1B, Evolved Node B (eNB) 124 interacts with the handset/IoT Device 192 and transfer the packet data to Serving Gateway (S-GW) 126. S-GW 126 communicates with Packet Data Network Gateway (P-GW) 128 which is responsible for enforcing traffic policies and generating Charging Data Records (CDR) for accounting purpose. P-GW 128 retrieves the traffic policies from Policy and Charging Rules Function (PCRF) server 136.

Additionally or alternatively, the usage information for network devices 192 may come from AAA 120 for 4G LTE integration to the billing and analytics system 122.

Additionally or alternatively, in certain network core integrations, Traffic Control Function (TCF) 130, for example, Aeris Packet Function (APF), may be used for enforcing rules and routing the packet data to destination. TCF 130 in conjunction with Network Firewalls (FW) 132 may provide packet destination IP for each M2M/IoT Device 192. Destination IP details are then be ingested into Billing and analytics system 122 and used for adaptive billing/learning pricing plan.

Thus, the network elements interacting with network devices 192 that provide network device 192 usage data to the billing and analytics system 122 when using 4G LTE network include any one or more of: Packet Data Network Gateway (P-GW) 128, Traffic Control Function (TCF) 130, for example, Aeris Packet Function (APF), Authorization and Accounting server (AAA) and Network Firewall (FW) 132.

In case of 5G Network, as illustrated in FIG. 1C, Next Generation NodeB (gNB) interacts with the user equipment, for example, M2M or IoT device, and facilitates data communication. Access and Mobility Function (AMF) is a single-entry point for the handset/IoT device connection. AMF communicates with Authentication Server Function (AUSF) to authenticate the IoT device. Based on the needs of M2M/IoT device, AMF communicates to Session Management Function (SMF) to manage the IoT device session. AMF also interacts with other network functions like Policy Control Function (PCF) to manage policy rules, Unified Data Management (UDM) to obtain user identity and auth credentials. Once the IoT devices is authenticated and session is established, it can start sending data via User Plane Function (UPF). UPF communicates to Charging Function (CHF) which in turn provides Charging Data Records (CDRs) to billing system through Charging Gateway Function (CGF).

Additionally or alternatively, in certain network core integrations, Traffic Control Function (TCF), for example, Aeris Packet Function (APF), may be used for enforcing rules and routing the packet data to destination. TCF in conjunction with Network Firewalls (FW) may provide packet destination IP for each Handset/IoT Device. Destination IP details are then be ingested into Billing and analytics system and used for adaptive billing/learning pricing plan.

Thus, the network elements interacting with network devices 192 that provide network device 192 usage data to the billing and analytics system 122 when using 5G network include any one or more of: Charging Function (CHF), Traffic Control Function (TCF), for example, Aeris Packet Function (APF) and Network Firewall (FW).

As used herein the term M2M/IoT communication is understood to include methods of utilizing various connected computing devices, servers, clusters of servers, wired and/or wirelessly, which provide a networked infrastructure to deliver computing, processing and storage capacity as services where a user typically accesses.

Figure 2:
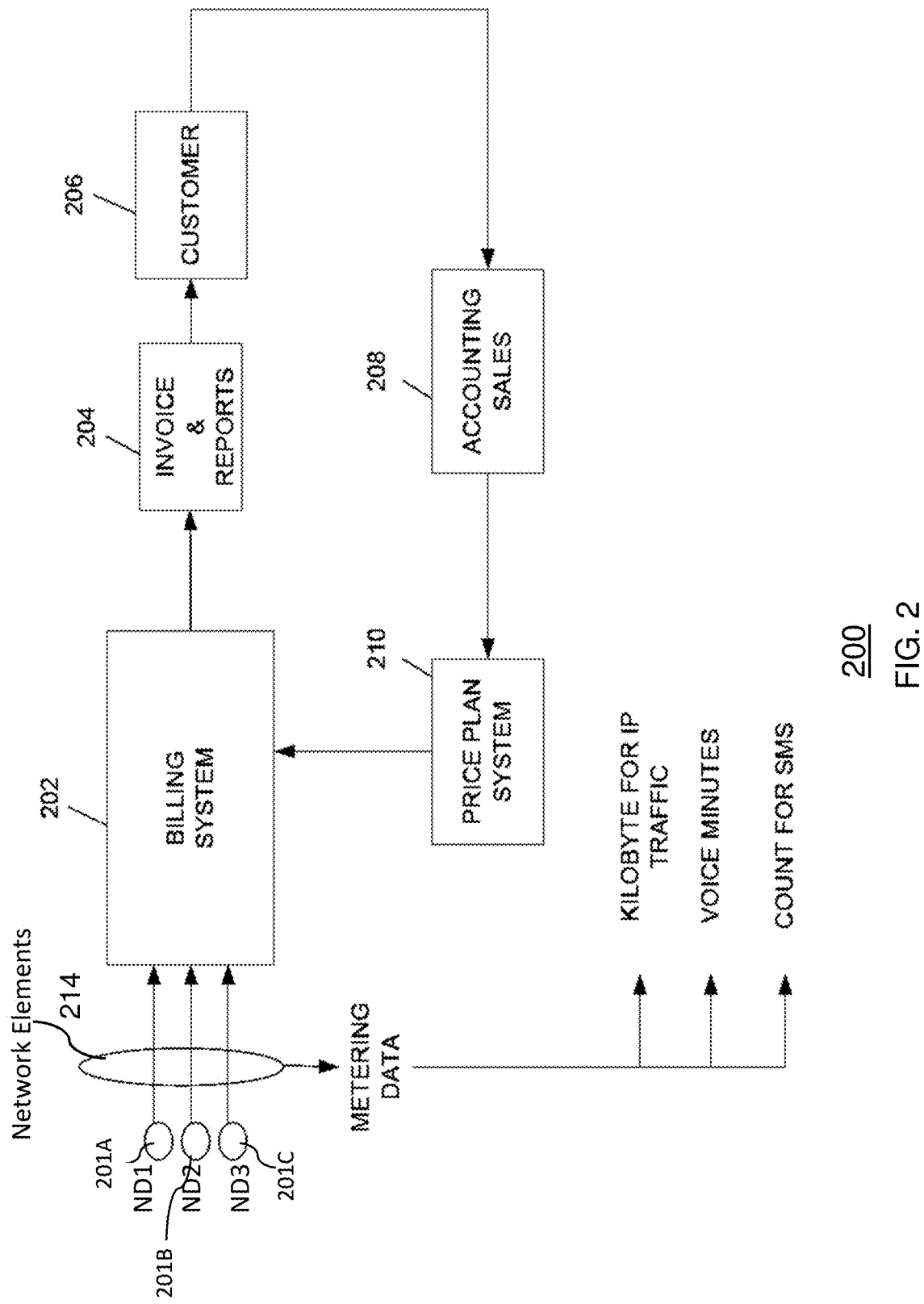
FIG. 2 illustrates a billing system working on M2M network.

FIG. 2 illustrates a conventional billing system architecture 200 utilized with M2M/IoT networks. The architecture 200 includes a network having network elements and network devices (NDx) (e.g. devices connected to the network such as M2M machines and/or IoT devices, for example, appliance, terminal, remote device, user equipment or wireless asset, machines, phones, communicators, etc.) 201A, 201B, 201C, a billing and administration system (BAS) 202, an invoice and reporting function 204, a customer function 206, an accounting and sales function 208, and a price plan system 210.

The BAS 202 provides for receiving data input from the NEs and also provides for calculating and determining billing and related administrative information for customer accounts in relation to the network devices being used on the associated network; the calculated billing and related administrative information is provided as input to the invoice and reporting function. The invoice and reporting function 204 provides for generating an invoice based on an arrangement between the network operator and the customer, typically in the form of a billing relating information about expenses arising from the NDs activity associated with the operator's network. Once input data is processed by the invoice and reporting function, billing details and routing of invoices, as one example, are then output to the customer function 206 in accordance with customer account details.

The customer function 206 provides for interaction with the customer and includes providing for arranging billing to the customer as well as receiving input from the customer (such as with discrepancies, account updates, device updates, other communications, etc.). Updates and requests from the customer function are input to the accounting and sales function 208. The accounting and sales function 208 may update, add, subtract and otherwise modify information associated with a customer's account, including device updates and billing plans, such that the BAS processing more accurately reflects the activities and administrative aspects of the customer account. The accounting and sales function 208 will output information to the Price Plan system including modifications to a customer's pricing plan and updated pricing plans available to the customer to better reflect a customer's needs. The Price Plan system 210 provides for information concerning the available billing, usage, device activity and associated network operations information concerning a customer's account. The pricing plans of a Price Plan system 210 may change from time to time to better reflect customer and market needs. The Price Plan system 210 outputs updates of the Price Plan as input to the BAS 202.

From FIG. 2, operatively, after receiving input of the NEs and the associated Price Plan system information, the BAS calculates a customer's bill based upon the price plan for the network devices, such as M2M machines and/or IoT devices, for example, appliance, terminal, remote device, user equipment or wireless asset. The calculated bill is output as input to the invoice and reporting function. The invoice and reporting function then generates invoices and routes the invoices to the customer, along with other reports as may be defined by the customer or operator. The customer receives the billings and reports via the customer function and may provide feedback or additional response, which when received is input to the accounting and sales function (e.g. accounting department) may then act in response to the customer feedback to adjust a billing, modify the account, adjust a price plan, and similar. Output from the accounting and sales function is processed by the Price Plan System to update pricing plan information which is then used by the BAS to calculate billings in a further activity.

It is desirable to be able to adjust the billing information before the accounting department receives the billing information and minimize the need for customer feedback. Furthermore, it is desirable to be able to adjust the billing information before the customer receives an invoice. Finally, it is desirable to be for the network to identify billing opportunities using the billing system architecture.

Accordingly, a system and method in accordance with an embodiment replaces the conventional billing system architecture a billing and analytics architecture. The billing and analytics architecture in accordance with an embodiment allows for a more accurate accounting of the revenues for an M2M/IoT network. Furthermore, such a system may minimize the need for customer feedback and concerns. Finally, such a system and method in accordance with an embodiment can be utilized to identify new billing opportunities in such a network. To describe the features of such a system refer now to the following description in conjunction with the accompanying Figures.

Figure 3:
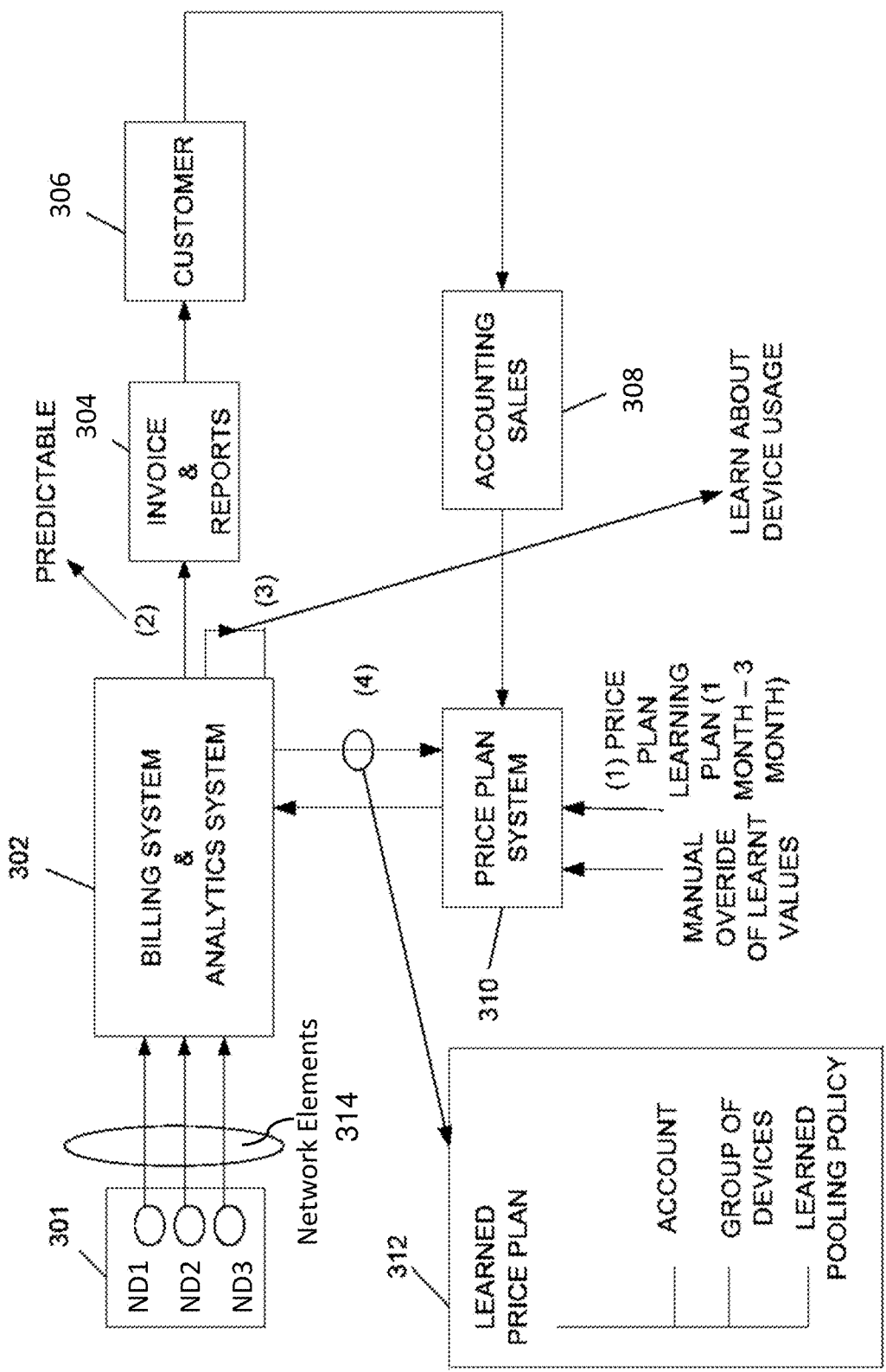
FIG. 3 is a block diagram of a billing and analytics architecture in accordance with one or more embodiments of the present invention. The system uses a process for adaptively determining the billing in accordance with one or one embodiments of the present invention.

FIG. 3 is a block diagram of a billing and analytics architecture 300 in accordance with an embodiment. Usage information for customer's network elements also known as network devices ND1, ND2 and ND3, collectively shown as 301 (M2M machines and/or IoT devices, for example, appliance, terminal, remote device, user equipment or wireless asset) is provided to a billing system and analytics system 302 via network elements 314.

For example, the network elements 314 interacting with network device/s 301 that provide network device/s 301 usage data to the billing and analytics system 302 when using 4G LTE network include any one or more of: Packet Data Network Gateway (P-GW), Traffic Control Function (TCF), for example, *Aeris* Packet Function (APF), Authorization and Accounting server (AAA) and Network Firewall (FW) as illustrated in FIG. 1B.

Similarly, for example, the network elements 314 interacting with network device/s 301 that provide network device/s 301 usage data to the billing and analytics system 302 when using 5G network include any one or more of: Charging Function (CHF), Traffic Control Function (TCF), for example, *Aeris* Packet Function (APF) and Network Firewall (FW) as illustrated in FIG. 1C.

ND1-ND3, collectively shown as 301, could be any type of device, appliance, terminal, remote device, user equipment, or wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

The billing system and analytics system 302 provides invoices and reports 304. A price plan system 310 receives device usage information from the system 302 and provides a guaranteed price plan to the billing and analytics system 302 and initially provides a guaranteed price plan for the customer's network elements also known as network devices. Device usage includes bytes in, bytes out, device roaming status, destination IP from FWs etc. Billing and analytics system uses the bytes in, bytes out, roaming status and destination IP details to learn the pricing plan. For example, depending on the destination IP address and amount of bytes transferred, the learning system could learn/suggest specific pricing options for specific destination IP address. The devices may be grouped based on any one or more of: destination IP address, device roaming status for learning the price plan. Inputs to the price plan system are an initial price plan and a manual override of learned values. To describe the features of this system in more detail please refer now to the following discussion and the accompanying Figures.

Figure 4:
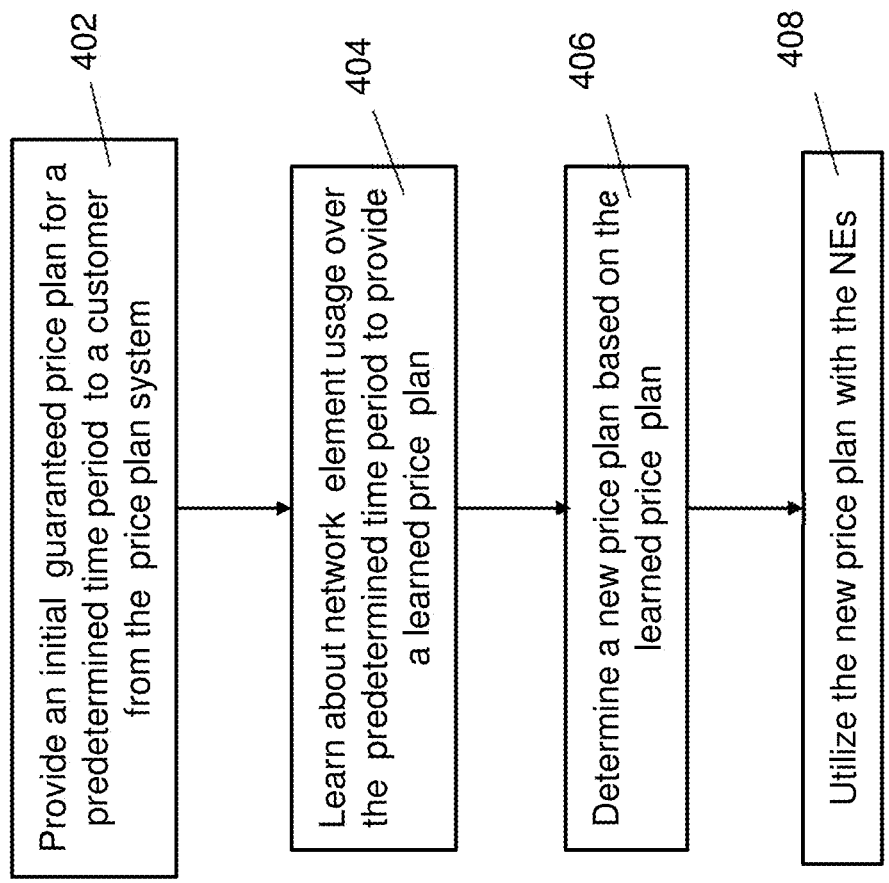
FIG. 4 is a flow chart of the operation of the billing and analytics architecture in accordance with one or more embodiments of the present invention.

FIG. 4 is a flow chart of the operation of the billing and analytics architecture 300 in accordance with an embodiment. In an embodiment, a process for adaptively determining a billing is provided. Referring to FIGS. 3 and 4 together, first an initial guaranteed price plan for a predetermined time period is provided to a customer, via step 402. Next, device usage over the predetermined time period is learned to provide a learned price plan, via step 404. The learned price plan can be for the whole account for a particular user, for a group of devices within the account, or for a learned pooling policy within the account. This allows for learning the price plan system and adaptively changing the price based upon usage. The new price plan is provided to the price plan system 310, via step 406. Finally, the new price plan is provided by the billing and analytics system 302 to be utilized with the customer's network elements, via step 408. This process can be repeated to ensure that the customer is getting the appropriate pricing for network element usage over the network.

In some instances, for example if the device usage fluctuates widely from one period to the next it may be desirable to rest from one system. Hence one of the inputs to the price plan system 310 is a manual override to the learned values such a learning process can begin again.

A billing and analytics architecture in accordance with an embodiment allows for a more accurate accounting of the revenues for an M2M/IoT network. Furthermore, such a system may minimize the need for customer feedback and concerns. Finally, such a system and method in accordance with an embodiment can be utilized to identify new billing opportunities in such a network.

System Overview

Figure 5:
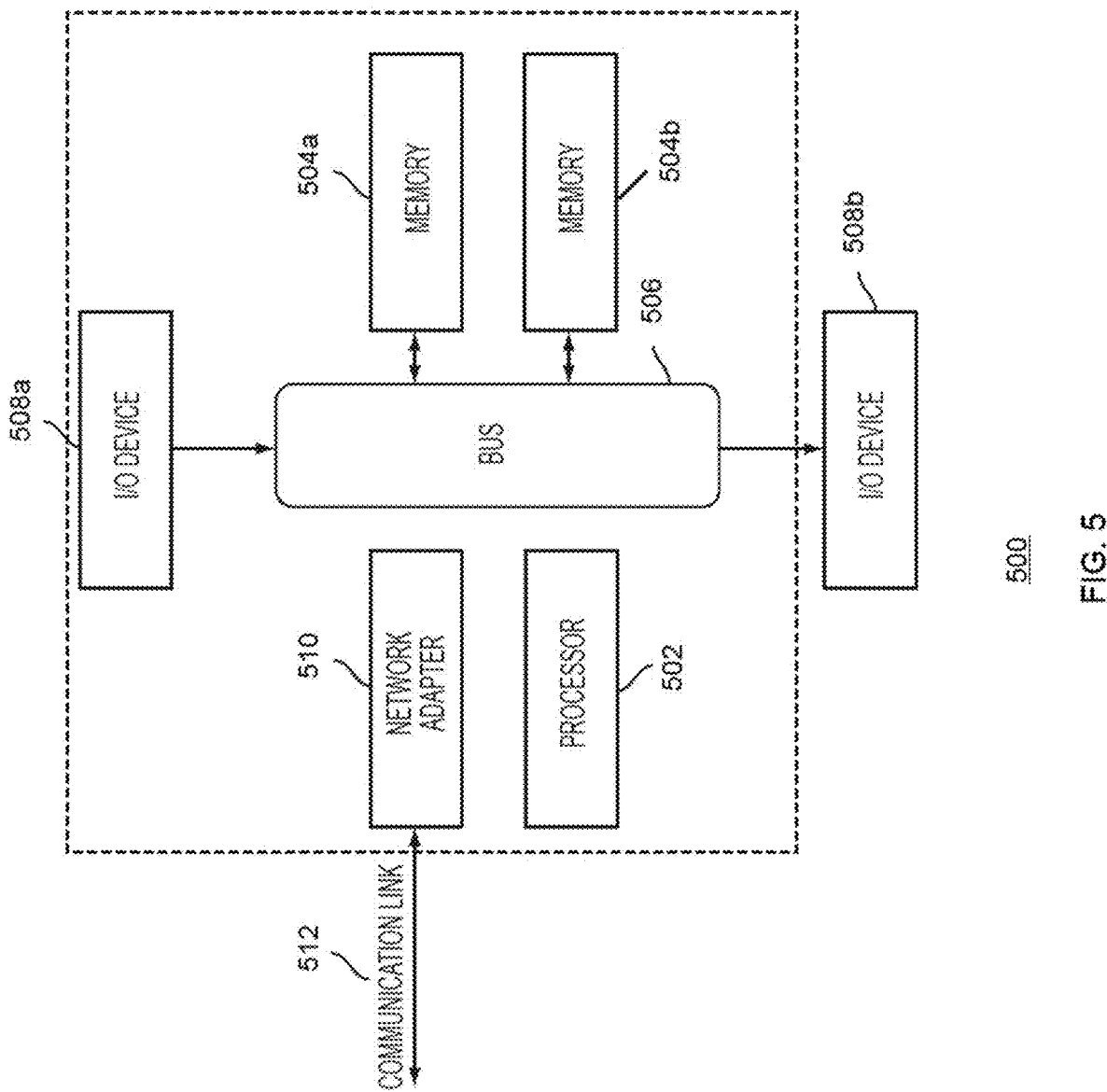
FIG. 5 illustrates a data processing system 500 suitable for storing the computer program product and/or executing program code in accordance with one or more embodiments of the present invention.

FIG. 5 illustrates a data processing system 500 suitable for storing the computer program product and/or executing program code in accordance with an embodiment of the present invention. The data processing system 500 includes a processor 502 coupled to memory elements 504*a-b* through a system bus 506. In other embodiments, the data processing system 500 may include more than one processor and each processor may be coupled directly or indirectly to one or more memory elements through a system bus.

Memory elements 504*a-b* can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to the data processing system 500. I/O devices 508*a-b* may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

Accordingly, a system and method in accordance with one or more embodiments presented above overcomes the challenges of existing practices and provides a more robust and convenient architecture enabling improved information and billing details to be provided to a customer, operator or other. The present invention also provides for more accurate and aligned accounting of a user's revenues or expenses for an M2M/IoT or similar network. Furthermore, such a system may minimize the need for customer feedback and concerns. Additionally, such a system and method in accordance with an embodiment can be utilized to identify new billing opportunities in such a network.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

What is claimed is:

1. A computer implemented method for use in machine to machine (M2M) or Internet of things (IoT) network including network devices; the method being performed by the M2M network comprising:
   providing an initial guaranteed price plan to a customer account for a plurality of network devices, associated with the customer account being used on the M2M/IoT network for a predetermined time period, wherein the M2M/IoT network includes a billing and analytics system;
   receiving data input from one or more network elements that interact with the plurality of network devices via at least one base station controller by the billing and analytics system;
   receiving usage information for the plurality of network devices being used on the M2M/IoT network over the predetermined time period from the billing and analytics system;
   providing a learned price plan for, at least, the customer account associated with the plurality of network devices being used on the M2M/IoT network, to the billing and analytics system;
   wherein the billing and analytics system conducts processing to adaptively change the initial guaranteed price plan to the learned price plan based on the received usage information, to produce the learned price plan for any of: the customer account for a particular user, for a group of network devices within the customer account, a learned pooling policy within the customer account, or a combination thereof; and
   implement the learned price plan by adaptively changing price based upon usage for the plurality of network devices used on the M2M/IoT network associated with the customer account.

2. The computer implemented method of claim 1, wherein the one or more network elements when using 4G LTE network include any one or more of: Packet Data Network Gateway (P-GW), Traffic Control Function (TCF), Authorization and Accounting server (AAA) and Network Firewall (FW).

3. The computer implemented method of claim 1, wherein the one or more network elements when using 5G network include any one or more of: Charging Function (CHF), Traffic Control Function (TCF), and Network Firewall (FW).

4. The computer implemented method of claim 1, receiving the usage information and providing a learned price plan steps periodically to determine if the new price plan is still appropriate.

5. The computer implemented method of claim 1, wherein the predetermined time period is one to three months.

6. The computer implemented method of claim 1, wherein the network devices comprise any type of machine to machine (M2M) device, Internet of Things (IoT) device, appliance, terminal, remote device, user equipment or wireless asset.

7. The computer implemented method of claim 1, wherein invoices and reports are produced for the customer based upon the usage of the one or more network devices.

8. The computer implemented method of claim 1, wherein a manual override of the learned values is provided under appropriate conditions.

9. A system for use in a machine to machine (M2M) or Internet of things (IoT) network, the system comprising:
- a price plan system, comprising at least one processor and a memory, wherein the price plan system is configured to provide an initial guaranteed price plan to customer account for a plurality of network devices being used on a machine to machine (M2M) of Internet of Things (IoT) network associated with the customer account for a predetermined time period; and
- a billing and analytics system comprising at least one processor, and a learning database, wherein the billing and analytics system is configured to:
  - receive usage information for a plurality of network devices that interact with the one or more network elements being used on the M2M/IoT network via at least one base station controller over a predetermined time period,
  - conduct processing to adaptively change the initial guaranteed price plan based on the received usage information, to provide a learned price plan for the customer account associated with the plurality of network devices being used on the M2M/IoT network;
  - wherein the learned price plan is for any of: the customer account for a particular user, for a group of network devices within the customer account, a learned pooling policy within the customer account, or a combination thereof;
  - transmit the learned price plan to the price plan system; and
  - implement the learned price plan by adaptively changing price based upon usage for the plurality of network devices being used on the M2M/IoT network associated with the customer account.

10. The system of claim 9, wherein the one or more network elements when using 4G LTE network include any one or more of: Packet Data Network Gateway (P-GW), Traffic Control Function (TCF), Authorization and Accounting server (AAA) and Network Firewall (FW).

11. The system of claim 9, wherein the one or more network elements when using 5G network include any one or more of: Charging Function (CHF), Traffic Control Function (TCF), and Network Firewall (FW).

12. The system of claim 9, repeating the receiving the usage information and providing a learned price plan steps periodically to determine if the new price plan is still appropriate.

13. The system of claim 9, wherein the predetermined time period is one to three months.

14. The system of claim 9, wherein the network devices comprise any type of machine to machine (M2M) device, Internet of Things (IoT) device, appliance, terminal, remote device, user equipment, or wireless asset.

15. The system of claim 9, wherein the billing and analytics system produces and reports for the customer based upon the usage of the one or more network devices.

16. The system of claim 9, wherein a manual override of the learned values is provided to the price plan system under appropriate conditions.

17. A non-transitory computer readable medium that stores computer-executable instructions that, upon execution, cause one or more processors to perform operations by the machine to machine (M2M) or Internet of things (IoT) network for use in a M2M or IoT network including network devices, the operations comprising:
- providing an initial guaranteed price plan to a customer account for a plurality of network devices being used on the M2M/IoT network associated with the customer account for a predetermined time period, wherein the M2M/IoT network includes a billing and analytics system;
- receiving data input from one or more network elements that interact with the plurality of network devices via at least one base station controller by the billing and analytics system;
- receiving usage information for the plurality of network devices being used on the M2M/IoT network over the predetermined time period from the billing and analytics system;
- providing a learned price plan for, at least, the customer account associated with the plurality of network devices being used on the M2M/IoT network, to the billing and analytics system;
  - wherein the billing and analytics system conducts processing to adaptively change the initial guaranteed price plan to the learned price plan based on the received network devices usage information, to produce the learned price plan for any of: the customer account for a particular user, for a group of network devices within the customer account, a learned pooling policy within the customer account, or a combination thereof; and
- implement the learned price plan by adaptively changing price based upon usage for the plurality of network devices used on the M2M/IoT network associated with the customer account.

18. The computer readable medium of claim 17, wherein the one or more network elements when using 4G LTE network include any one or more of: Packet Data Network Gateway (P-GW), Traffic Control Function (TCF), Authorization and Accounting server (AAA) and Network Firewall (FW).

19. The computer readable medium of claim 17, wherein the one or more network elements when using 5G network include any one or more of: Charging Function (CHF), Traffic Control Function (TCF), and Network Firewall (FW).

20. The computer readable medium of claim 17, repeating the receiving the usage information and providing a learned price plan steps periodically to determine if the new price plan is still appropriate.

21. The computer readable medium of claim 17, wherein the predetermined time period is one to three months.

22. The computer readable medium of claim 17, wherein the network devices comprise any type of machine to machine (M2M) device, Internet of Things (IoT) device, appliance, terminal, remote device, user equipment, or wireless asset.

23. The computer readable medium of claim 17, wherein invoices and reports are produced for the customer based upon the usage of the one or more network devices.

24. The computer readable medium of claim 17, wherein a manual override of the learned values is provided under appropriate conditions.

\* \* \* \* \*